(12) United States Patent
Chui (10) Patent No.: US 12,447,876 B2
(45) Date of Patent: Oct. 21, 2025

(54) CHILD CARRIER

(71) Applicant: Wonderland Switzerland AG, Steinhausen (CH)

(72) Inventor: Zongwang Chui, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 116 days.

(21) Appl. No.: 17/972,564

(22) Filed: Oct. 24, 2022

(65) Prior Publication Data
US 2023/0128918 A1 Apr. 27, 2023

(30) Foreign Application Priority Data

Oct. 25, 2021 (CN) ......................... 202111242957.3

(51) Int. Cl.
*B60N 2/28* (2006.01)
(52) U.S. Cl.
CPC ......... *B60N 2/2839* (2013.01); *B60N 2/2842* (2013.01); *B60N 2/2884* (2013.01)
(58) Field of Classification Search
None
See application file for complete search history.

(56) References Cited

U.S. PATENT DOCUMENTS

| | | | | |
|---|---|---|---|---|
| 3,335,434 A | * | 8/1967 | Gamon | A47C 20/028 297/DIG. 2 |
| 3,563,600 A | * | 2/1971 | Converse | B60N 2/286 297/254 |
| 3,582,136 A | * | 6/1971 | Pringle | A44B 11/2511 297/483 |
| 4,583,533 A | * | 4/1986 | Goodley | A61H 1/0292 482/904 |
| 4,984,845 A | * | 1/1991 | Knoedler | B60R 22/3405 297/487 |
| 5,607,203 A | | 3/1997 | Sedlack | |
| 5,690,382 A | * | 11/1997 | Cone | B60N 2/286 297/487 |
| 6,428,099 B1 | | 8/2002 | Kain | |
| 7,370,912 B2 | | 5/2008 | Williams | |

(Continued)

FOREIGN PATENT DOCUMENTS

| CN | 208682671 U | 4/2019 |
|---|---|---|
| CN | 110356297 A | 10/2019 |

(Continued)

OTHER PUBLICATIONS

Office action mailed/issued on Jun. 28, 2023 for TW application No. 111140348, filing date: Oct. 25, 2022, pp. 1-9.

(Continued)

*Primary Examiner* — Kristina R Fulton
(74) *Attorney, Agent, or Firm* — Winston Hsu (57) ABSTRACT

The present application relates to a child carrier, which includes a seat, an impact shield, an adjustment mechanism, and an operating member. A seating space for accommodating a child is enclosed between the impact shield and the seat. The adjustment mechanism is disposed on a side of the impact shield. The operating member is connected to the adjustment mechanism. The operating member is configured to be operated to act on the adjustment mechanism to adjust a size of the seating space.

15 Claims, 12 Drawing Sheets

(56) References Cited

U.S. PATENT DOCUMENTS

| | | | | |
|---|---|---|---|---|
| 9,028,006 | B2* | 5/2015 | Yi | A47D 15/006 |
| | | | | 297/487 |
| 10,314,409 | B2* | 6/2019 | Yu | A47D 1/00 |
| 2010/0060056 | A1 | 3/2010 | Pos | |
| 2011/0089728 | A1* | 4/2011 | Wuerstl | B60N 2/28 |
| | | | | 297/216.11 |
| 2015/0115677 | A1* | 4/2015 | Pos | B60N 2/286 |
| | | | | 297/468 |
| 2018/0001798 | A1 | 1/2018 | Hutchinson | |
| 2022/0001775 | A1* | 1/2022 | Chen | B60N 2/28 |

FOREIGN PATENT DOCUMENTS

| | | |
|---|---|---|
| CN | 209995767 U | 1/2020 |
| CN | 211364826 U | 8/2020 |
| CN | 212022969 U | 11/2020 |
| CN | 113428087 A | 9/2021 |
| DE | 103 06 341 B4 | 6/2012 |
| DE | 10 2014 103 122 B4 | 5/2019 |
| DE | 10 2019 205 122 B4 | 9/2021 |
| DE | 2609100 B | 7/2023 |
| EP | 2 364 875 A2 | 9/2011 |
| EP | 2 364 875 B1 | 11/2015 |
| GB | 2515371 | 12/2014 |
| GB | 2515371 B4 | 12/2014 |
| GB | 2572867 | 10/2019 |
| GB | 2609100 B | 7/2023 |
| KR | 1999-0021725 U | 6/1999 |
| KR | 2002-0023614 A | 3/2002 |

OTHER PUBLICATIONS

Office action mailed/issued on Jan. 23, 2024 for TW application No. 111140348, filing date: Oct. 25, 2022, pp. 1~9, Jan. 23, 2024.
Office action mailed/issued on Dec. 8, 2023 for AU application No. 2022259732, filing date: Oct. 25, 2022, pp. 1~5, Dec. 8, 2023.
Office action mailed/issued on Mar. 8, 2024 for AU application No. 2022259732, filing date: Oct. 25, 2022, pp. 1~5, Mar. 8, 2024.
Office action mailed/issued on Feb. 8, 2024 for DE application No. 10 2022 211 281.4, filing date: Oct. 25, 2022, pp. 1~6, Feb. 8, 2024.
Office action mailed/issued on Jul. 4, 2024 for CN application No. 202111242957.3, filing date: Oct. 25, 2021, pp. 1~13. ,Jul. 4, 2024.
Office action mailed/issued on Dec. 3, 2024 for TW application No. 111140348, filing date: Oct. 25, 2022, pp. 1~9. ,Dec. 3, 2024.

* cited by examiner

CHILD CARRIER

BACKGROUND OF THE INVENTION

1. Field of the Invention

The present disclosure relates to the technical field of child carriers, in particular, to a child carrier, such as a child safety seat.

2. Description of the Prior Art

Child carriers, such as child safety seats, are generally provided with five-way buckles or impact shields for securing children. When a child is secured by the impact shield, the contact area between the impact shield and the child is large, and in the event of an accident such as an impact, the impact shield acts a small pressure on the child while it is protecting the child. Thus, the impact shield is widely applied. In order to be adapted to different sizes of children, the impact shield generally has an adjustable structure. However, operating members of the adjustment structure of the impact shield are usually disposed on both sides of the impact shield, and thus the impact shield needs to be operated with two hands, which is inconvenient for use.

SUMMARY OF THE INVENTION

According to various embodiments of the present disclosure, a child carrier is provided.

A child carrier includes a seat, an impact shield, an adjustment mechanism, and an operating member. The impact shield encloses a seating space for accommodating a child with the seat therebetween. The adjustment mechanism is disposed on a side of the impact shield. The operating member is connected to the adjustment mechanism and configured to be operated to act on the adjustment mechanism to adjust a size of the seating space.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions, and advantages of the present disclosure become more apparent, the present disclosure will be further described in detail below with reference to the accompanying drawings and specific embodiments. It should be understood that the specific embodiments described herein are only used to explain the present disclosure, and do not limit the protection scope of the present disclosure.

It should be noted that when an element is referred to as being "fixed to" another element, it can be directly on the other element or an intermediate element may also be present at the same time. When an element is referred to as being "connected to" another element, it can be directly connected to another element or an intermediate element may also be present at the same time.

Unless otherwise defined, all technological and scientific terms used herein have the same meanings as commonly understood by one of ordinary skill in the art to which the present disclosure belongs. The terms used herein in the description of the present disclosure are for the purpose of describing specific embodiments only, and are not intended to limit the present disclosure.

The present disclosure provides a child carrier, which is adapted for one-hand adjusting a distance between an impact shield and a seat, and is convenient to use.

Figure 1:
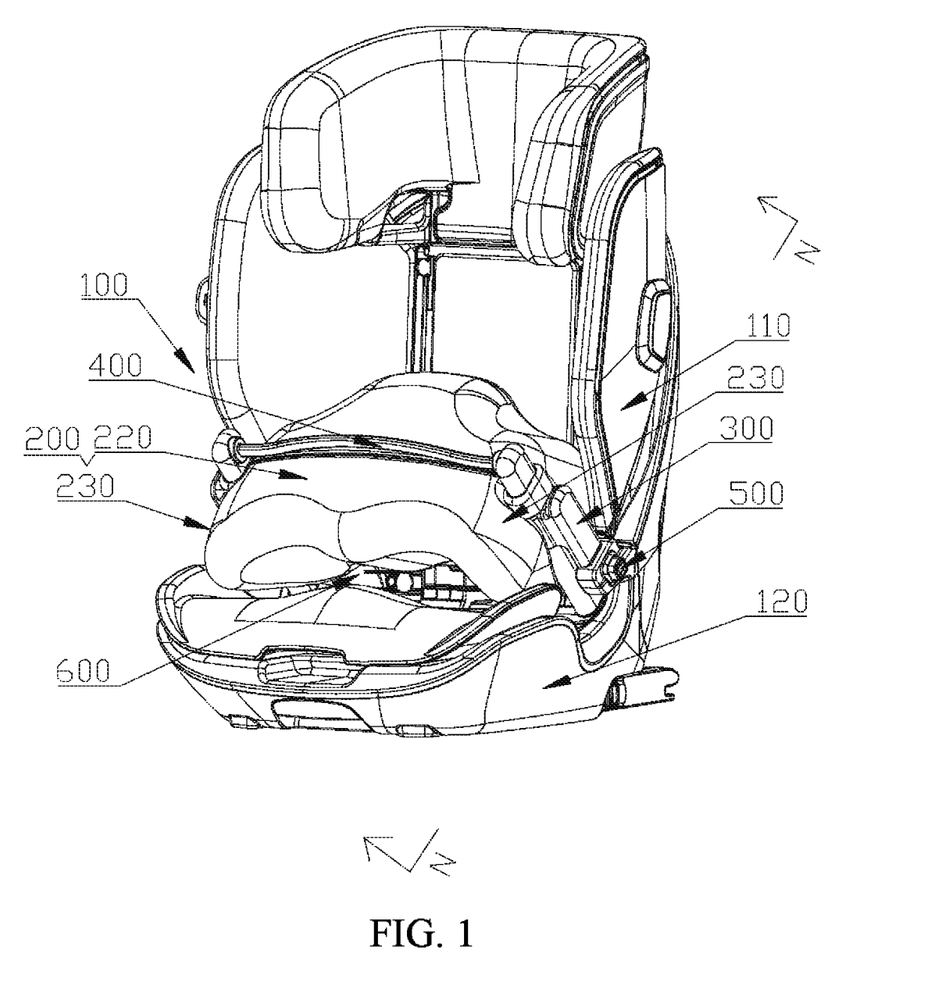
FIG. 1 is a schematic view of a child carrier according to an embodiment of the present disclosure, in which an impact shield is in a position adjacent to a seat.
Figure 2:
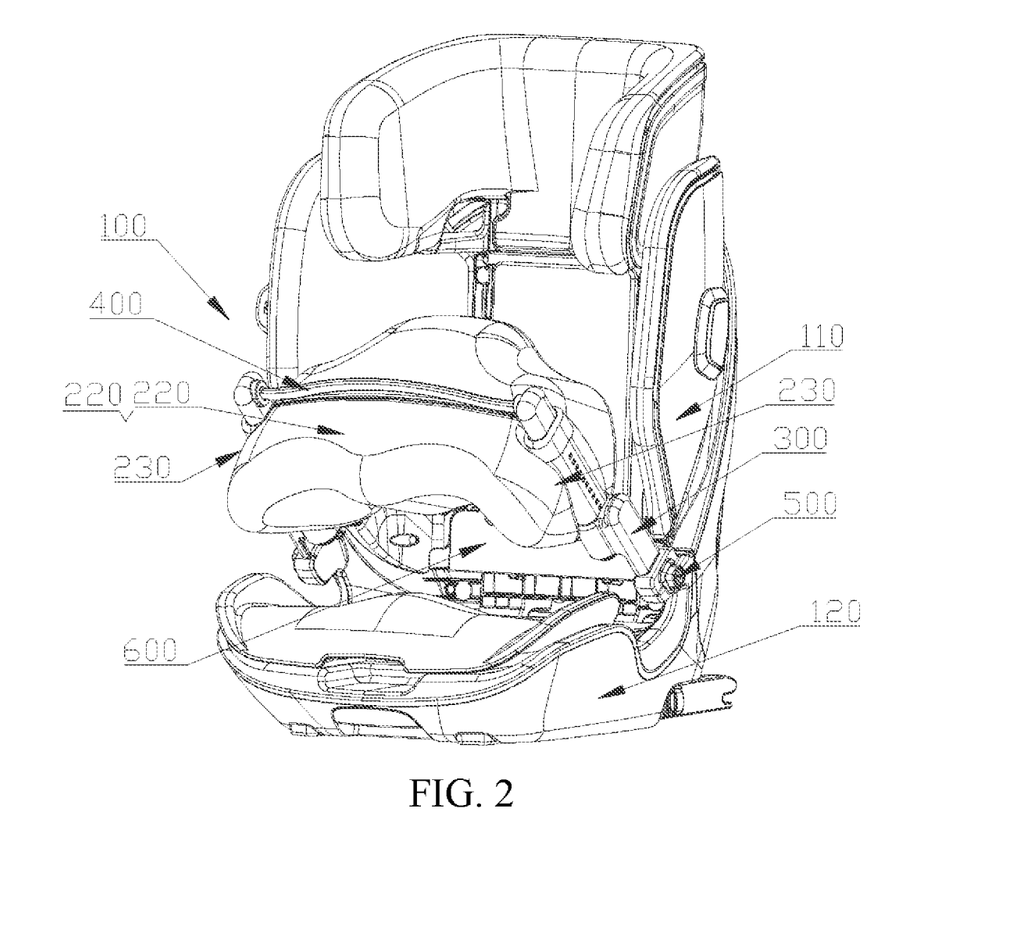
FIG. 2 is a schematic view of the child carrier shown in FIG. 1, in which the impact shield is in a position away from the seat.

As shown in FIGS. 1 and 2, an embodiment of the present disclosure provides a child carrier, for example, a child safety seat. The child carrier includes a seat 100, an impact shield 200, an adjustment mechanism 300, an operating member 400, and a locking mechanism 500. The impact shield 200 is detachably fixed to the seat 100. A seating space 600 for accommodating a child is formed between the impact shield 200 and the seat 100. The adjustment mechanism 300 is disposed between the impact shield 200 and the seat 100, and is configured to adjust the distance between the impact shield 200 and the seat 100, that is, to adjust the size of the seating space 600. The adjustment mechanisms 300 are disposed on both sides of the impact shield 200, and the operating member 400 is connected to the adjustment mechanisms 300 arranged on both sides of the impact shield 200, respectively. In another embodiment, the impact shield 200 has only one adjustment mechanism 300 arranged on one side thereof, and a linkage mechanism (not shown) arranged on the other side thereof, and the operating member 400 is connected to the adjustment mechanism 300 and the linkage mechanism, respectively. The locking mechanism 500 is configured to achieve a detachable connection between the impact shield 200 and the seat 100. The child carrier is adapted for one-handed adjusting the distance between the impact shield 200 and the seat 100, and is convenient to use.

Figure 5:
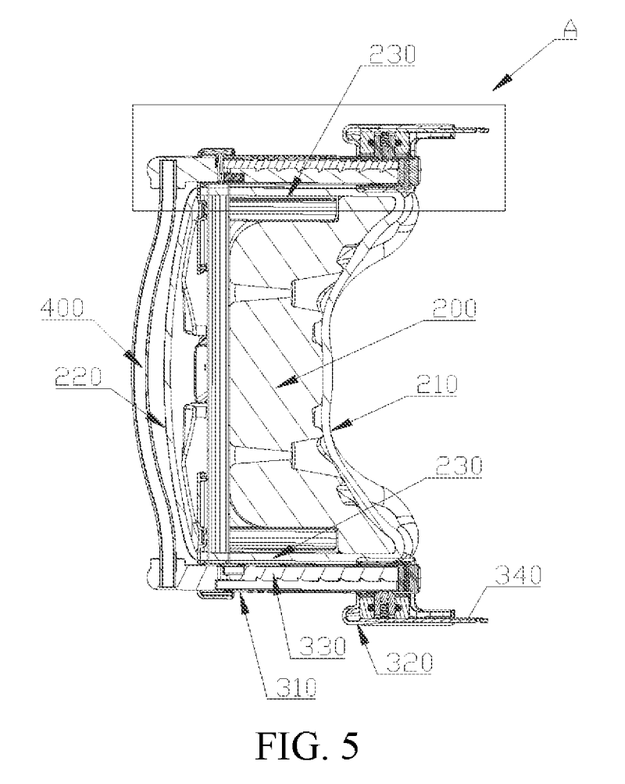
FIG. 5 is a cross-sectional view of the child carrier shown in FIG. 3 taken along line M-M, in which engaging teeth are engaging with engaging holes.

Specifically, as shown in FIGS. 1 and 5, the seat 100 includes a backrest 110 and a seat base 120 that are connected to each other. The impact shield 200 may be a lightweight solid block structure or a shell structure made of foam materials such as expanded polystyrene (EPS), expanded polypropylene (EPP), or expanded polyethylene-polystyrene (EPO). In this embodiment, the impact shield 200 includes a first surface 210 facing the seat 100, and the first surface 210 is concave, so as to enclose the seating space 600 for accommodating a child with the seat 100 therebetween. The impact shield 200 further includes a second surface 220 facing away from the seat 100, and the second surface 220 is convex and generally partially spherical.

As shown in FIGS. 5 to 10, the adjustment mechanism 300 is configured to adjust the distance between the impact shield 200 and the seat 100, that is, to adjust the size of the seating space 600. Specifically, the adjustment mechanism 300 includes an adjustment assembly 310, a sliding assembly 320, a lock releasing assembly 330, and a connecting member 340. The adjustment assembly 310 maybe fixed on either side 230 of the impact shield 200. The sliding assembly 320 is configured to be connected to the seat 100. The adjustment assembly 310 is slidably connected to the sliding assembly 320. The lock releasing assembly 330 is configured to release the locking between the adjustment assembly 310 and the sliding assembly 320. The connecting member 340 is fixed to the sliding assembly 320 and is configured to be detachably connected to the seat 100.

Figure 6:
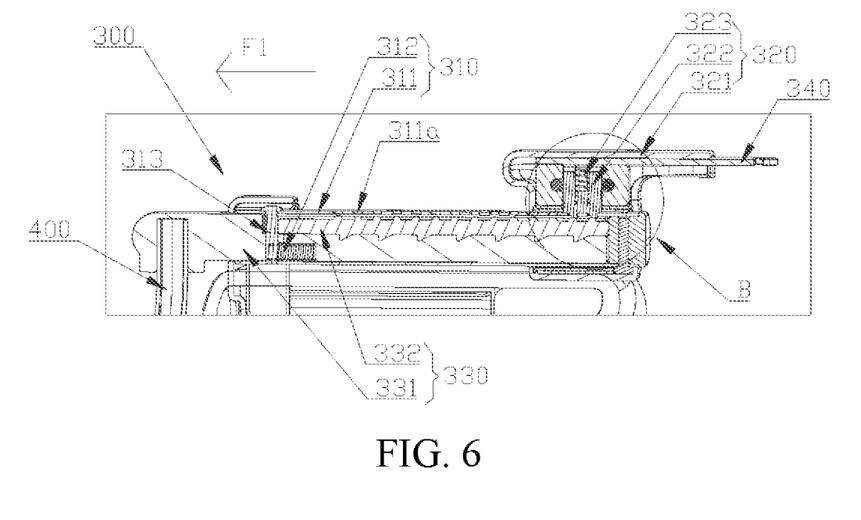
FIG. 6 is an enlarged view of a portion A of FIG. 5.

Specifically, as shown in FIGS. 5 and 6, the adjustment assembly 310 includes an adjustment body 311 and a second reset piece 312. The adjustment body 311 has a substantially long tubular structure. A side of the adjustment body 311 is fixed to one side 230 of the impact shield 200, and the other side of the adjustment body 311 facing away from the impact shield 200 is provided with a plurality of engaging holes 311a along a longitudinal direction of the adjustment body 311.

Figure 7:
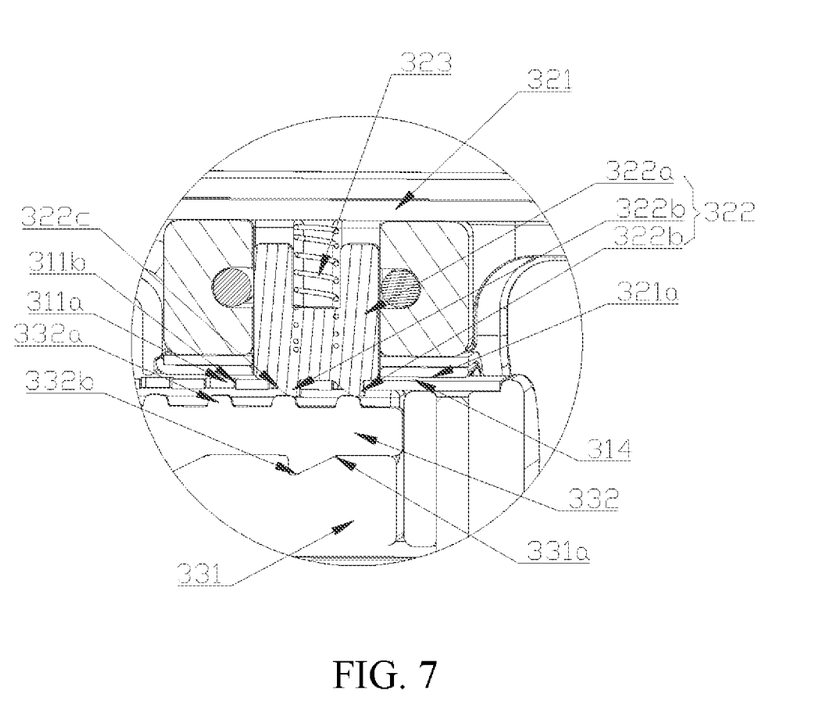
FIG. 7 is an enlarged view of a portion B of FIG. 6.
Figure 8:
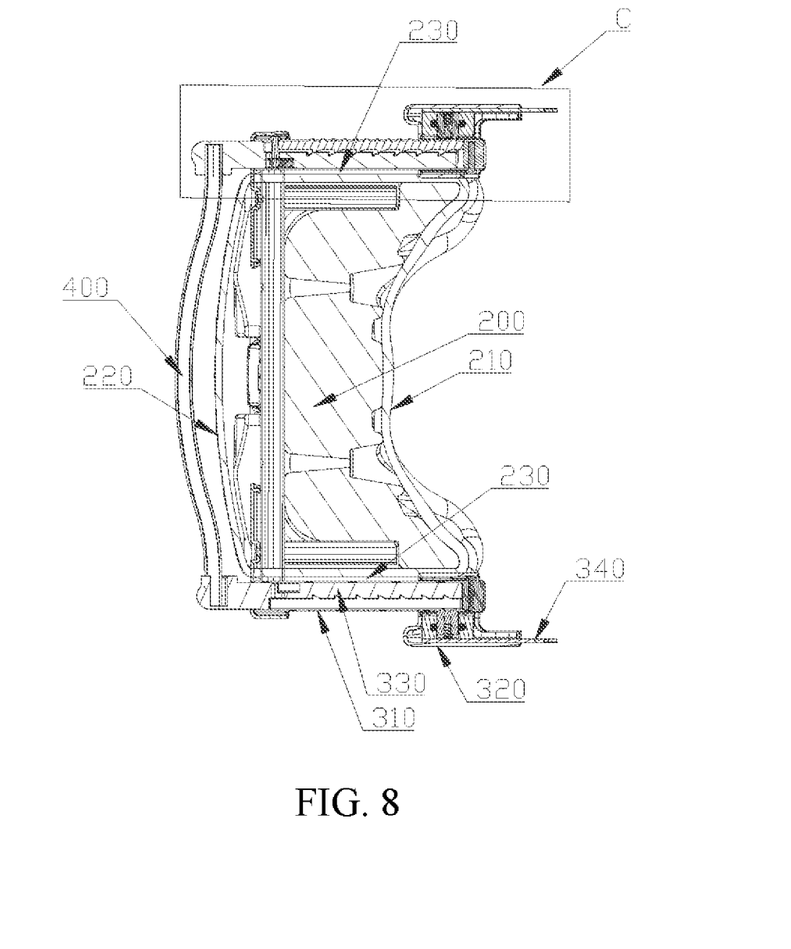
FIG. 8 is another cross-sectional view of the child carrier shown in FIG. 3 taken along the line M-M, in which the engaging teeth are released from the engaging holes.
Figure 9:
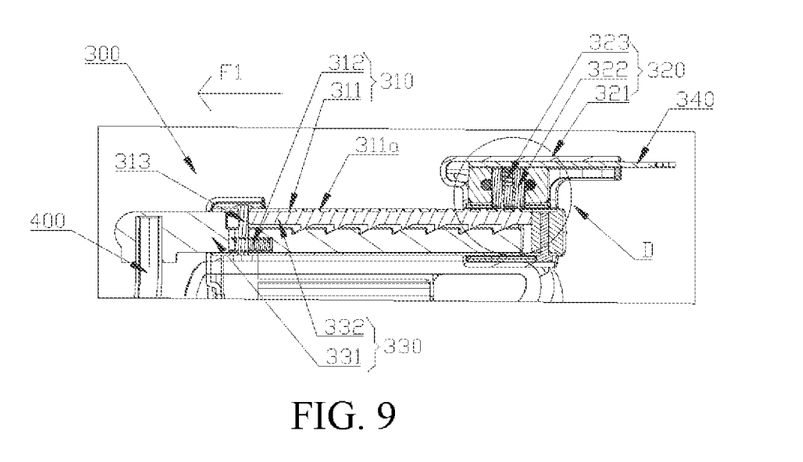
FIG. 9 is an enlarged view of a portion C of FIG. 8.

Further, as shown in FIGS. 5 to 7, the sliding assembly 320 is arranged on the side of the adjustment assembly 310 facing away from the impact shield 200, and is slidably connected to the adjustment assembly 310. Specifically, the sliding assembly 320 includes a sliding body 321, an engaging member 322, and a first reset piece 323. The sliding body 321 has a substantially shell-like structure. The engaging member 322 is movably disposed in the sliding body 321, and includes an engaging body 322a and engaging teeth 322b fixed on the engaging body 322a. The sliding body 321 has a through hole (not shown) formed in its surface facing the adjustment body 311. The engaging member 322 may move to the extent where the engaging teeth 322b protrude, through the through hole, out of the outer surface 321a of the sliding body 321 facing the adjustment body 311, so that the engaging teeth 322b may be engaged in the engaging holes 311a.

In this way, the relative locking between the sliding assembly 320 and the adjustment assembly 310 can be achieved, so that the impact shield 200 is fixed at a certain distance from the seat 100, to forma certain size of seating space 600. When the sliding assembly 320 and the adjustment assembly 310 slide relative to each other, the engaging teeth 322b can be engaged in different engaging holes 311a, so that the size of the seating space 600 can be adjusted.

In this embodiment, as shown in FIG. 7, there are two engaging teeth 322b to improve the engaging stability between the engaging teeth 322b and the engaging holes 311a. Of course, in other embodiments, the number of the engaging teeth 322b can change according to actual needs.

Further, as shown in FIG. 6 and FIG. 7, both ends of the first reset piece 323 abut against the engaging member 322 and the sliding body 321, respectively. The first reset piece 323 always urges the engaging member 322 to move in a direction approaching to the impact shield 200, so that the engaging teeth 322b and the engaging holes 311a can be automatically re-engaged.

Of course, the mating manner between the adjustment assembly 310 and the sliding assembly 320 is not limited to this. The engaging holes 311a can be replaced with other mating portions such as grooves, rings, or the like, according to actual needs, and the engaging teeth 322b can also be replaced by other mating portions such as protrusions, hooks, or the like, according to actual needs. In this embodiment, the adjustment assembly 310 is provided with a plurality of first mating portions (e.g., engaging holes 311a), and the sliding assembly 320 is provided with second mating portions (e.g., engaging teeth 322b) configured to mate with the first mating portions. Of course, in other embodiments, the arrangement positions of the first mating portions and the second mating portions can also be interchanged, as long as the adjustment assembly 310 and the sliding assembly 320 can be relatively fixed at different positions, and the specific manner is not limited.

Further, as shown in FIGS. 7 to 10, the engaging tooth 322b is further provided with an inclined sliding surface 322c at one side thereof, and the inclined sliding surface 322c is configured to abut against a hole wall 311b of the engaging hole 311a. In this way, assuming that the inclined sliding surface 322c is gradually away from the impact shield 200 in a first direction F1, when the impact shield 200 needs to be moved in a direction opposite to the first direction F1, the impact shield 200 only needs to be pushed in the direction opposite to the first direction F1, and the hole wall 311b of the engaging hole 311a on the adjustment body 311 may push the inclined sliding surface 322c, so that the engaging member 322 is moved upward as a whole until the engaging teeth 322b are separated from the engaging holes 311a. In this case, the adjustment assembly 310 and the sliding assembly 320 are released from locking, while the impact shield 200 moves in the direction opposite to the first direction F1.

In this embodiment, the inclined sliding surface 322c is disposed on a side of the engaging tooth 322b facing the first direction F1 and is gradually away from the impact shield 200 along the first direction F1. When the impact shield 200 needs to be moved in a direction approaching to the seat 100, that is, when the seating space 600 needs to be reduced, the impact shield 200 only needs to be pushed in the direction approaching to the seat 100. As shown in FIG. 6, FIG. 7, FIG. 9, and FIG. 10, the lock releasing assembly 330 is configured to push the engaging member 322 to be separated from the engaging holes 311a. The lock releasing assembly 330 includes a linkage 331 and a driving member 332 that are connected to each other. The linkage 331 has substantially a rod-shaped structure. One end of the linkage 331 is fixedly connected to the operating member 400 and is driven to move by the operating member 400. A portion of the linkage 331 away from the operating member 400 extends into the adjustment body 311 and is arranged at a side of the adjustment body 311 adjacent to the impact shield 200. A first inclined driving surface 331a is disposed at a side of the linkage 331 away from the impact shield 200. Both ends of the second reset piece 312 abut against the linkage 331 and the adjustment body 311, respectively. The second reset piece 312 always urges the linkage 331 to move in a direction opposite to a direction in which the driving member 332 is pushed for releasing, for example, in a direction opposite to the first direction F1. Specifically, a rivet 313 is fixed on the adjustment body 311, and both ends of the second reset piece 312 abut against the linkage 331 and the rivet 313, respectively.

As shown in FIG. 6, FIG. 7, FIG. 9, and FIG. 10, the driving member 332 is disposed in the adjustment body 311. The driving member 332 may push the engaging member 322 to enable the engaging member 322 and the engaging holes 311*a* to be released from engaging. The driving member 332 has substantially a rod-shaped structure, and is disposed on a side of the adjustment body 311 away from the impact shield 200. The driving member 332 is provided with, at a side thereof away from the impact shield 200, a plurality of pushing protrusions 332*a* abutting against the engaging members 322. The plurality of pushing protrusions 332*a* are arranged corresponding to the plurality of engaging holes 311*a*. The pushing protrusions 332*a* may protrude out of the outer surface 314 of the adjustment assembly 310 through the engaging holes 311*a* to push the engaging teeth 322*b*, such that the engaging teeth 322*b* and the engaging holes 311*a* are released from engaging. In this way, the locking between the adjustment assembly 310 and the sliding assembly 320 may be released, and the adjustment assembly 310 and the sliding assembly 320 may slide relative to each other to adjust the size of the seating space 600 between the impact shield 200 and the seat 100.

As shown in FIG. 6, FIG. 7, FIG. 9, and FIG. 10, a second inclined driving surface 332*b*, cooperating with the first inclined driving surface 331*a*, is disposed at a side of the driving member 332 adjacent to the impact shield 200. In this embodiment, the second inclined driving surface 332*b* is gradually away from the engaging holes 311*a* along the first direction F1. In this way, when the impact shield 200 needs to be moved in the first direction F1, the linkage 331 may be pulled to move in the first direction F1. Thus, the second inclined driving surface 332*b* of the driving member 332 may move in a direction away from the impact shield 200 under the pushing action of the first inclined driving surface 331*a*, so that the whole driving member 332 moves in the direction away from the impact shield 200, i.e., in the direction approaching to the engaging holes 311*a*. Hence, the pushing protrusions 332*a* on the driving member 332 may protrude out of the outer surface 314 of the adjustment assembly 310 through the engaging holes 311*a* to push the engaging teeth 322*b*, so that the engaging teeth 322*b* and the engaging holes 311*a* are released from engaging.

Further, as shown in FIG. 1 to FIG. 4, the operating member 400 has a substantially rod-shaped structure. In this embodiment, both ends of the operating member 400 are fixedly connected to the linkage 331 of the adjustment mechanisms 300 arranged on both sides of the impact shield 200, respectively. Of course, in other embodiments, the middle or other positions of the operating member 400 may also be fixedly connected to the linkage 331 of the adjustment mechanisms 300 arranged at both sides of the impact shield 200. In this way, the operating member 400 may be pulled to simultaneously act on the two adjustment mechanisms 300 to adjust the distance between the impact shield 200 and the seat 100, which can be achieved by one-handed operation, without simultaneously putting two hands to both sides of the impact shield 200 to adjust the adjustment mechanisms 300, and is convenient to operate. In this embodiment, the operating member 400 is arranged on a surface of the impact shield 200 facing away from the seating space 600, i.e., the second surface 220, so as to be more convenient for a user to operate. Of course, in other embodiments, the operating member 400 may also be arranged on the top of or at other positions of the impact shield 200, as long as the operation is convenient.

As shown in FIGS. 1, 2, and 5 to 10, the adjusting process of the impact shield 200 relative to the seat 100 is as follows.

Figure 10:
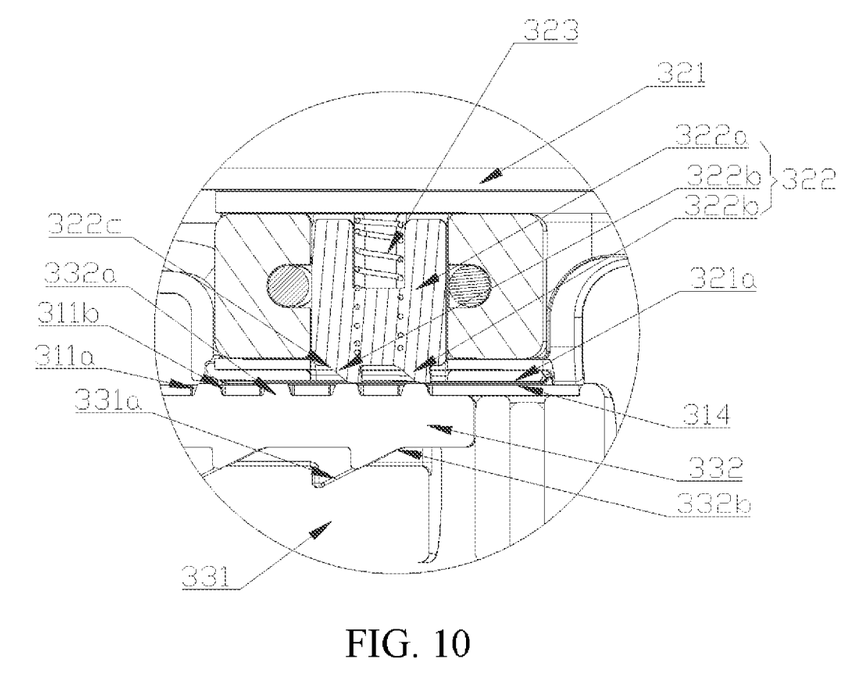
FIG. 10 is an enlarged view of a portion D of FIG. 9.
Figure 11:
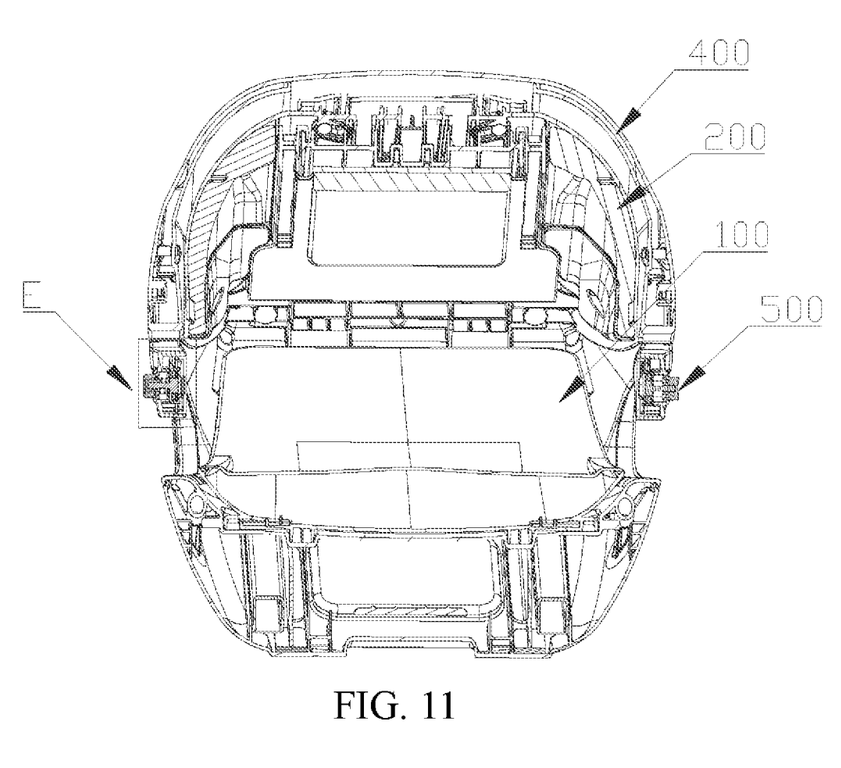
FIG. 11 is a cross-sectional view of the child carrier shown in FIG. 1 taken along line N-N, in which a locking mechanism is in a locked state.

When the impact shield 200 needs to be moved in a direction away from the seat 100, that is, when the seating space 600 needs to be increased, the operating member 400 is pulled in the direction away from the seat 100, and the operating member 400 drives the linkage 331 to move in the first direction F1. At the same time, the driving member 332, whose second inclined driving surface 332*b* originally cooperates with the first inclined driving surface 331*a* of the linkage 331, is moved in the direction away from the impact shield 200 under the pushing action of the first inclined driving surface 331*a*, so that the pushing protrusions 332*a* on the driving member 332 push the engaging teeth 322*b*, and finally the engaging teeth 322*b* are separated from the engaging holes 311*a*, as shown in FIG. 10. Hence, the adjustment assembly 310 and the sliding assembly 320 are released from locking and may slide relative to each other. Since the adjustment assembly 310 is fixed on the impact shield 200 and the sliding assembly 320 is configured to be connected to the seat 100, the adjustment assembly 310 slides relative to the sliding assembly 320, that is, the impact shield 200 may slide relative to the seat 100. Hence, the adjustment assembly 310 moves in the first direction F1 relative to the sliding assembly 320, and the distance between the impact shield 200 and the seat 100 increases, that is, the seating space 600 increases. After the adjustment assembly 310 moves to a desired position relative to the sliding assembly 320, the operating member 400 is released, the linkage 331 is moved in the direction opposite to the first direction F1 under the action of the second reset piece 312, and the driving member 332 is driven to move in the direction approaching to the impact shield 200. At the same time, the engaging member 322 is also moved in the direction approaching to the impact shield 200 under the action of the first reset piece 323, and finally the engaging teeth 322*b* are engaged with other engaging holes 311*a*, as shown in FIG. 7. In this way, the relative fixation of the adjustment assembly 310 and the sliding assembly 320, i.e., the re-locking of the impact shield 200 and the seat 100 is finished.

When the impact shield 200 needs to be moved in the direction approaching to the seat 100, that is, when the seating space 600 needs to be reduced, only the impact shield 200 needs to be moved in the direction opposite to the first direction F1, and in this case, the inclined sliding surfaces 322*c* on the engaging member 322 are moved upward under the pushing action of the hole walls 311*b* of the engaging holes 311*a*, causing that the engaging teeth 322*b* are driven to be separated from the engaging holes 311*a*. In this way, the adjustment assembly 310 and the sliding assembly 320 are released from locking, that is, the impact shield 200 and the seat 100 are released from locking, the impact shield 200 is moved in the direction approaching to the seat 100, and the seating space 600 is reduced. After the impact shield 200 moves to a desired position relative to the seat 100, the pushing of the impact shield 200 is stopped, and the engaging member 322 is moved in the direction approaching to the impact shield 200 under the action of the first reset piece 323 until the engaging teeth 322*b* are engaged with other engaging holes 311*a*. Therefore, the relative fixation of the adjustment assembly 310 and the sliding assembly 320, i.e., the re-locking of the impact shield 200 and the seat 100, is finished.

Figure 3:
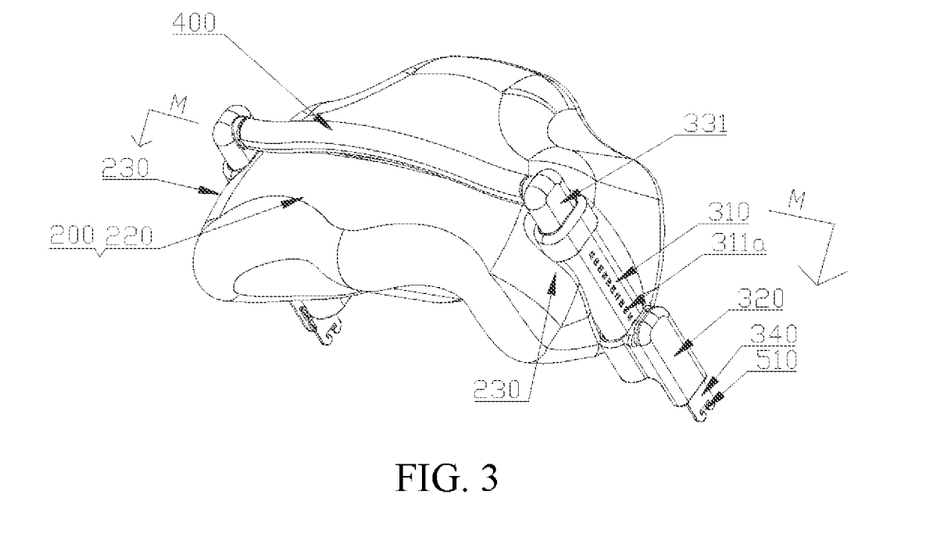
FIG. 3 is a schematic view of the child carrier shown in FIG. 2, in which the seat is omitted.
Figure 4:
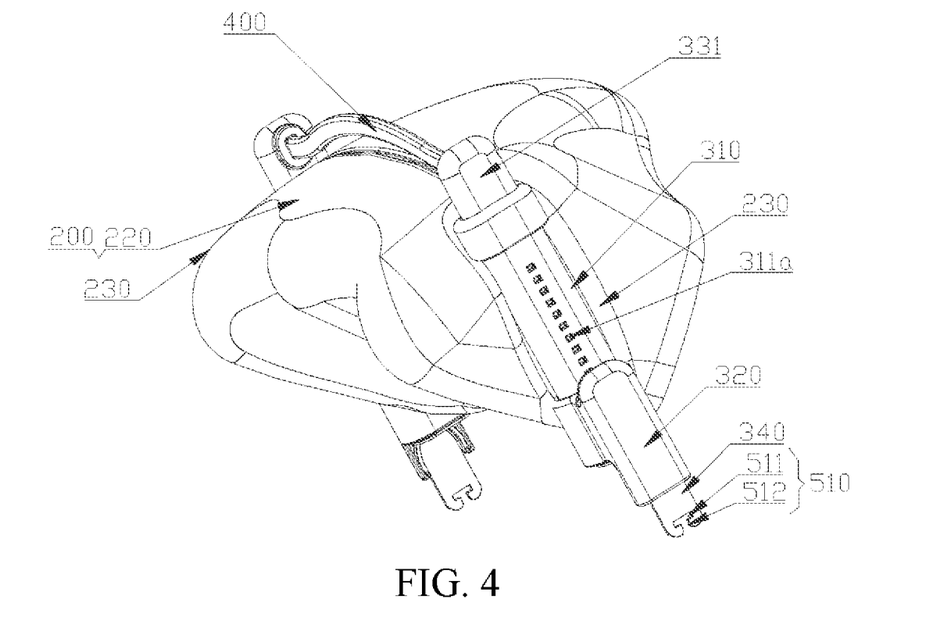
FIG. 4 is a schematic view of the child carrier shown in FIG. 3 seen from another viewpoint.

As shown in FIGS. 11 to 14, the locking mechanism 500 has a locked state and an unlocked state. When the locking mechanism 500 is in the locked state, the impact shield 200 is locked and fixed to the seat 100, and when the locking mechanism 500 is in the unlocked state, the impact shield 200 is detachable from the seat 100. Specifically, the locking mechanism 500 includes a connecting portion 510 (as shown in FIGS. 3 and 4), a locking housing 520, a connecting pin 530, a lock releasing button 540, and a third reset piece 550. The connecting portion 510 is arranged on the connecting member 340. The locking housing 520 is fixed to the seat 100. The connecting pin 530 is movably disposed in the locking housing 520. The lock releasing button 540 is connected to an end of the connecting pin 530. Both ends of the third reset piece 550 abut against the lock releasing button 540 and the locking housing 520, respectively.

As shown in FIGS. 3 and 4, the connecting portion 510 specifically includes a connecting hole 511 and a connecting port 512, which are disposed on the connecting member 340 and communicate with each other. The aperture of the connecting hole 511 is larger than that of the connecting port 512. In this embodiment, the connecting portion 510 is disposed at an end of the connecting member 340 away from the sliding assembly 320, but not limited thereto.

Figure 12:
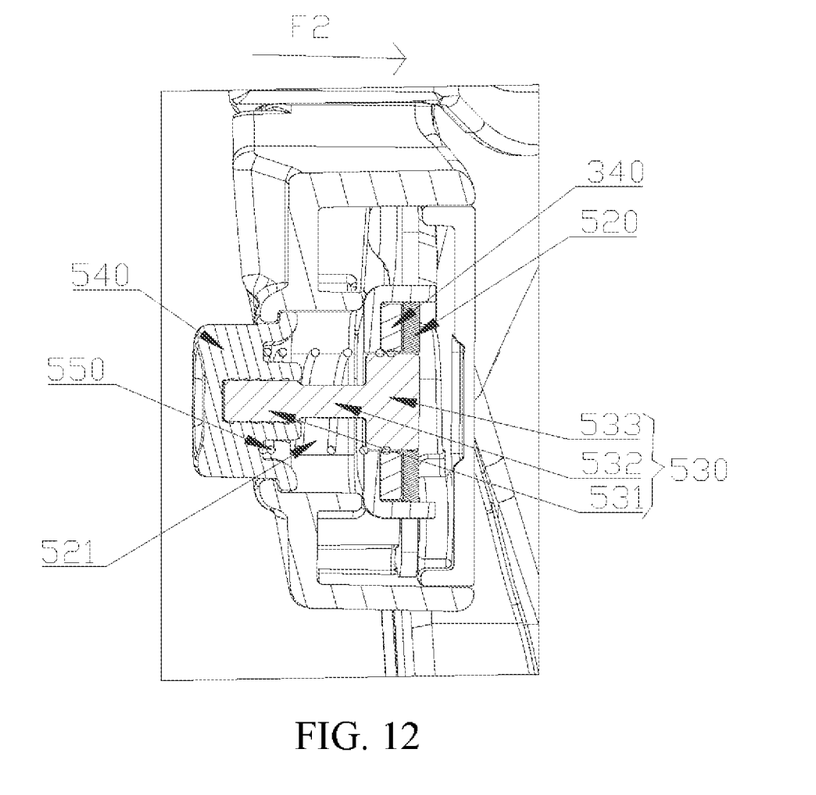
FIG. 12 is an enlarged view of a portion E of FIG. 11.
Figure 13:
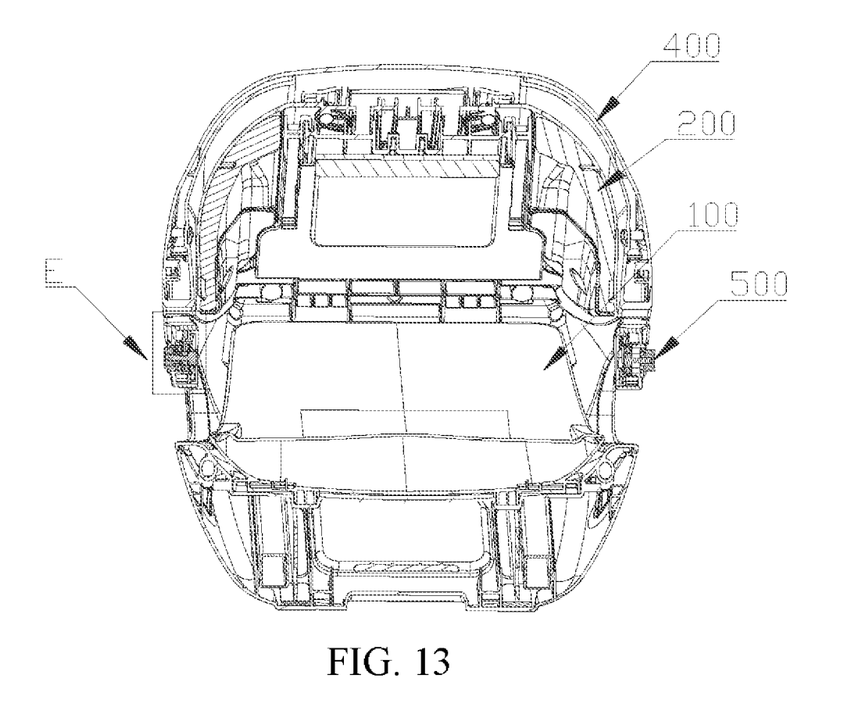
FIG. 13 is another cross-sectional view of the child carrier shown in FIG. 1 taken along the line N-N, in which the locking mechanism is in an unlocked state.
Figure 14:
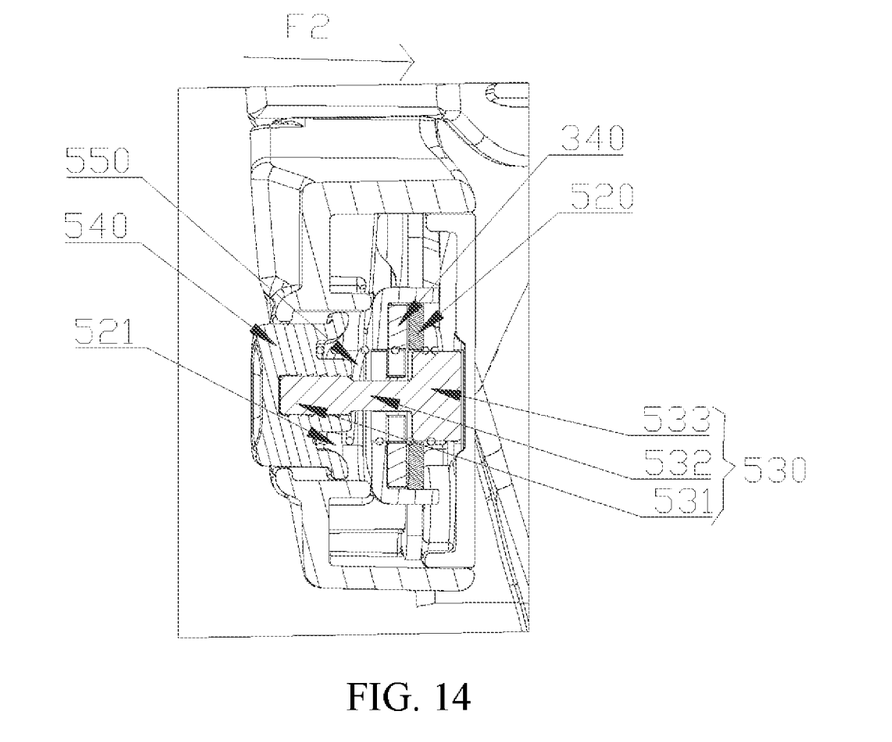
FIG. 14 is an enlarged view of a portion F of FIG. 13.

As shown in FIGS. 12 and 14, the locking housing 520 is a substantially rectangular parallelepiped housing, and is provided with an accommodating cavity 521 therein for accommodating the connecting pin 530. The locking housing 520 is provided with an insertion opening (not shown in the figures) in communication with the accommodating cavity 521. The insertion opening is configured for insertion of the connecting member 340.

Figure 15:
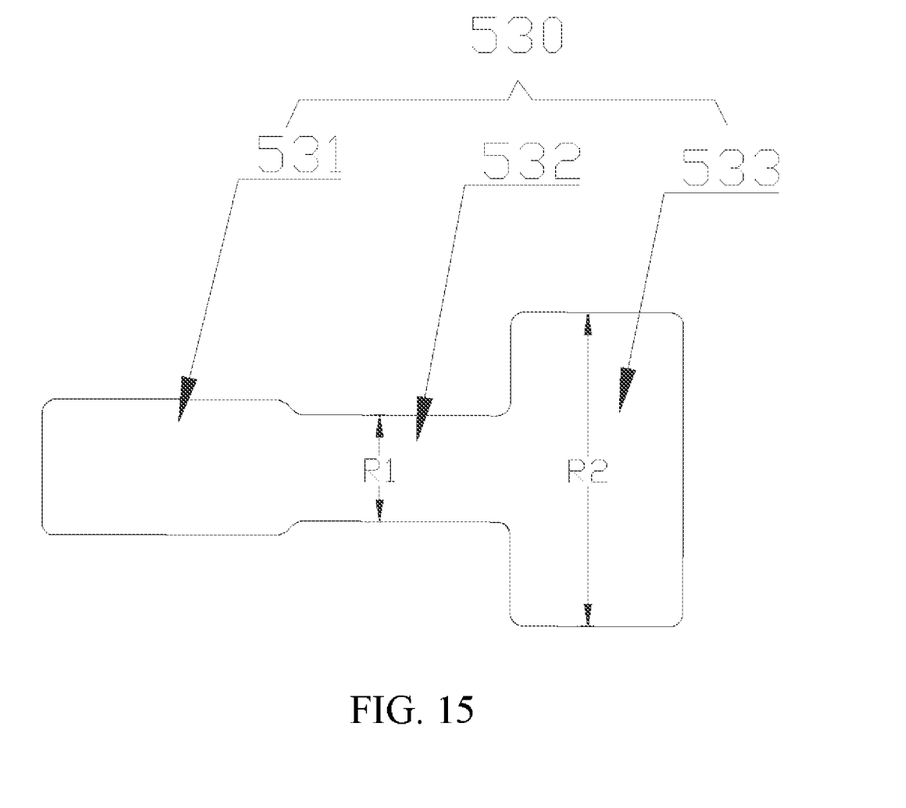
FIG. 15 is a schematic view of a connecting pin shown in FIG. 14.

As shown in FIG. 12, FIG. 14, and FIG. 15, the connecting pin 530 has a substantially columnar structure, and includes a fixing portion 531, a lock releasing portion 532, and a blocking portion 533 that are connected in sequence. The fixing portion 531 is configured to be connected to the lock releasing button 540. A radial dimension R1 of the lock releasing portion 532 is less than the aperture of the connecting port 512. A radial dimension R2 of the blocking portion 533 is greater than the aperture of the connecting port 512 and less than the aperture of the connecting hole 511. The connecting pin 530 is inserted into the connecting hole 511 through the connecting port 512, and the connecting pin 530 is movable so that the blocking portion 533 or the lock releasing portion 532 is located in the connecting hole 511.

As shown in FIGS. 12 and 14, the lock releasing button 540 is fixed on the fixing portion 531 of the connecting pin 530, and the lock releasing button 540 is partially arranged in the accommodating cavity 521 and partially protrudes out of a surface of the locking housing 520 for pressing operations.

In this way, when the impact shield 200 is required to be mounted and fixed to the seat 100, the lock releasing button 540 is pressed in the second direction F2 as shown in FIGS. 12 and 14, and the end of the connecting member 340 provided with the connecting portion 510 is inserted into the accommodating cavity 521 through the insertion opening. The insertion direction of the connecting member 340 is perpendicular to a longitudinal direction of the connecting pin 530. In this case, the lock releasing portion 532 of the connecting pin 530 faces with the connecting port 512, and since the radial dimension R1 of the lock releasing portion 532 is less than the aperture of the connecting port 512, the connecting pin 530 is inserted into the connecting hole 511 through the connecting port 512, as shown in FIG. 14. Then, the lock releasing button 540 is released, and is reset in a direction opposite to the second direction F2 under the action of the third reset piece 550. At the same time, the connecting pin 530 is driven to move in the direction opposite to the second direction F2 until the blocking portion 533 of the connecting pin 530 is located in the connecting hole 511 and faces with the connecting port 512. Since the radial dimension R2 of the blocking portion 533 is greater than the aperture of the connecting port 512 and less than the aperture of the connecting hole 511, the blocking portion 533 blocks the connecting port 512, and the connecting member 340 is prohibited to be pulled out from the accommodating cavity 521, as shown in FIG. 12. In this way, the connection and fixation between the sliding assembly 320 and the seat 100, i.e., the mounting and fixation of the impact shield 200 to the seat 100 is finished.

When the impact shield 200 is required to be detached from the seat 100, the lock releasing button 540 is pressed in the second direction F2 such that the connecting pin 530 is moved in the second direction F2 until the lock releasing portion 532 of the connecting pin 530 is located in the connecting hole 511 and faces with the connecting port 512, as shown in FIG. 14. Since the radial dimension R1 of the lock releasing portion 532 is less than the aperture of the connecting port 512, the lock releasing portion 532 may move out of the connecting hole 511 through the connecting port 512, that is, the end of the connecting member 340 provided with the connecting portion 510 may be pulled out from the accommodating cavity 521 in this case. The fixing between the sliding assembly 320 and the seat 100 is released, and the impact shield 200 may be detached from the seat 100.

Of course, the detachable connection between the impact shield 200 and the seat 100 can be implemented in other ways, such as arranging a rotatable connecting hook on the sliding assembly 320, and arranging a connecting hole 511 cooperating with the connecting hook on the seat 100, etc., which is not limited thereto.

The child carrier according to the present disclosure has at least the following technical effects.

In the child carrier, the adjustment mechanism 300 for adjusting the size of the seating space 600 is arranged on a side of the impact shield 200, and the operating member 400 is connected to the adjustment mechanism 300 arranged on the side of the impact shield 200. In this way, by operating the operating member 400, the adjustment mechanism 300 arranged on the side of the impact shield 200 may be acted on to adjust the distance between the impact shield 200 and the seat 100, that is, to adjust the size of the seating space, which can be achieved by one-handed operation, instead of making adjustment with two hands on both sides of the impact shield, and is convenient to use.

The technical features of the above-described embodiments can be combined arbitrarily. To simplify the description, not all possible combinations of the technical features in the above embodiments are described. However, all of the combinations of these technical features should be considered as being fallen within the scope of the present application, as long as such combinations do not contradict with each other.

The foregoing embodiments merely illustrate some embodiments of the present application, and descriptions thereof are relatively specific and detailed. However, it should not be understood as a limitation to the patent scope of the present application. It should be noted that, a person of ordinary skill in the art may further make some variations and improvements without departing from the concept of the present application, and the variations and improvements falls in the protection scope of the present application. Therefore, the protection scope of the present application shall be subject to the appended claims.

What is claimed is:

1. A child carrier, comprising:
   a seat;
   an impact shield, the impact shield and the seat enclosing a seating space for accommodating a child between the impact shield and the seat;
   an adjustment mechanism disposed on a side of the impact shield;
   an operating member connected to the adjustment mechanism, and configured to be operated to act on the adjustment mechanism to adjust a size of the seating space; and
   a locking mechanism, wherein the locking mechanism has a locked state and an unlocked state, wherein in the locked state, the impact shield is locked and fixed to the seat, and in the unlocked state, the impact shield is detachable from the seat;
   wherein the adjustment mechanism comprises:
   an adjustment assembly fixed on the side of the impact shield;
   a sliding assembly connected to the seat, and being slidably connected to the adjustment assembly; and
   a connecting member configured to be connected to the seat;
   wherein the locking mechanism comprises a connecting portion disposed on the connecting member and a connecting pin disposed on the seat, and the connecting pin is movable to lock or unlock the connecting portion;
   wherein the connecting portion comprises a connecting hole and a connecting port that communicate with each other, and an aperture of the connecting hole is larger than that of the connecting port;
   wherein the connecting pin comprises a blocking portion and a lock releasing portion that are connected to each other, a diameter of the blocking portion is greater than a maximum dimension across the connecting port and less than the aperture of the connecting hole, and a diameter of the lock releasing portion is less than the maximum dimension across the connecting port;
   wherein the connecting pin is configured to be inserted into the connecting hole through the connecting port, and the connecting pin is movable to enable the blocking portion or the lock releasing portion to be located in the connecting hole.

2. The child carrier according to claim 1, wherein the operating member is arranged on a surface of the impact shield facing away from the seating space.

3. The child carrier according to claim 1, wherein the operating member is configured to be operated to enable the adjustment assembly and the sliding assembly to slide relative to each other;
   wherein the adjustment assembly is provided with a plurality of engaging holes, and the sliding assembly is provided with an engaging member configured to engage with the engaging holes;
   wherein the sliding assembly further comprises a sliding body, the engaging member is movably disposed in the sliding body, and the engaging member is provided with engaging teeth configured to protrude out of an outer surface of the sliding body to be engaged in the engaging holes;
   wherein each of the engaging teeth is provided with an inclined sliding surface at a side thereof, and the inclined sliding surface is configured to abut against a hole wall of one of the engaging holes.

4. The child carrier according to claim 3, wherein the adjustment mechanism further comprises a lock releasing assembly, and the operating member is configured to be operated to enable the lock releasing assembly to push the engaging member.

5. The child carrier according to claim 4, wherein the lock releasing assembly comprises a driving member disposed in the adjustment assembly, and the operating member is configured to be operated to enable the driving member to push the engaging member.

6. The child carrier according to claim 3, wherein the sliding assembly further comprises a sliding body and a first reset piece having two ends abutting against the engaging member and the sliding body, respectively.

7. The child carrier according to claim 5, wherein the lock releasing assembly further comprises a linkage connected to the operating member, and the operating member is configured to be operated to enable the linkage to drive the driving member to push the engaging member, such that the engaging member is disengaged from the engaging holes.

8. The child carrier according to claim 7, wherein the linkage comprises a first inclined driving surface, and the driving member comprises, at a side thereof facing the seating space, a second inclined driving surface cooperating with the first inclined driving surface.

9. The child carrier according to claim 8, wherein the engaging member is provided with engaging teeth configured to be engaged in the engaging holes, each of the engaging teeth is provided with an inclined sliding surface at a side thereof, and the inclined sliding surface is configured to abut against a hole wall of one of the engaging holes, wherein an inclined direction of the inclined sliding surface intersects that of the second inclined driving surface.

10. The child carrier according to claim 8, wherein the adjustment assembly further comprises an adjustment body and a second reset piece having two ends abutting against the linkage and the adjustment body, respectively.

11. The child carrier according to claim 1, wherein the locking mechanism further comprises a lock releasing button connected to the connecting pin.

12. The child carrier according to claim 11, wherein the connecting pin further comprises a fixing portion connected to an end of the lock releasing portion away from the blocking portion, and the lock releasing button is fixed on the fixing portion.

13. The child carrier according to claim 11, wherein the locking mechanism further comprises a third reset piece having two ends abutting against the lock releasing button and the seat, respectively.

14. The child carrier according to claim 1, wherein the adjustment mechanism is disposed on each of both sides of the impact shield, and the operating member is connected to the adjustment mechanisms, respectively.

15. A child carrier, comprising:
    a seat;
    an impact shield, the impact shield and the seat enclosing a seating space for accommodating a child between the impact shield and the seat;
    an adjustment mechanism disposed on a side of the impact shield; and an operating member connected to the adjustment mechanism, and configured to be operated to act on the adjustment mechanism to adjust a size of the seating space;

wherein the adjustment mechanism comprises:

an adjustment assembly fixed on the side of the impact shield; and a sliding assembly connected to the seat, and being slidably connected to the adjustment assembly;

wherein the operating member is configured to be operated to enable the adjustment assembly and the sliding assembly to slide relative to each other;

wherein the adjustment assembly is provided with a plurality of engaging holes, and the sliding assembly is provided with an engaging member configured to engage with the engaging holes;

wherein the adjustment mechanism further comprises a lock releasing assembly, and the operating member is configured to be operated to enable the lock releasing assembly to push the engaging member;

wherein the lock releasing assembly comprises a driving member disposed in the adjustment assembly, and the operating member is configured to be operated to enable the driving member to push the engaging member;

wherein the driving member is provided with, at a side thereof away from the impact shield, a plurality of pushing protrusions abutting against the engaging member;

wherein the plurality of pushing protrusions are arranged corresponding to the plurality of engaging holes, and the operating member is configured to be operated to enable the pushing protrusions to protrude out of an outer surface of the adjustment assembly through the engaging holes to push the engaging member.

* * * * *